(12) United States Patent
Ponikiewski et al.

(10) Patent No.: US 11,814,097 B2
(45) Date of Patent: Nov. 14, 2023

(54) STEERING COLUMN ASSEMBLY

(71) Applicant: ZF Steering Systems Poland Sp. Z.o.o., Czechowice-Dziedzice (PL)

(72) Inventors: Pawel Ponikiewski, Pewel Mala (PL); Artur Wojtalik, Katowice (PL); Dawid Klimek, Żywiec (PL); Lukasz Dudzic, Tychy (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 0 days.

(21) Appl. No.: 17/972,755

(22) Filed: Oct. 25, 2022

(65) Prior Publication Data
US 2023/0129317 A1 Apr. 27, 2023

(30) Foreign Application Priority Data

Oct. 27, 2021 (EP) ..................................... 21461608
Feb. 17, 2022 (GB) ..................................... 2202121

(51) Int. Cl.
*B62D 1/19* (2006.01)
(52) U.S. Cl.
CPC ..................................... *B62D 1/195* (2013.01)
(58) Field of Classification Search
CPC ................................ B62D 1/195; B62D 1/192
See application file for complete search history.

(56) References Cited

U.S. PATENT DOCUMENTS

| 2005/0076735 A1 | 4/2005 | Li et al. |
| 2005/0247533 A1 | 11/2005 | Manwaring et al. |

(Continued)

FOREIGN PATENT DOCUMENTS

| CN | 105691440 A | * | 6/2016 | ............... B62D 1/16 |
| CN | 107567408 A | * | 1/2018 | ............. B62D 1/184 |

(Continued)

*Primary Examiner* — Drew J Brown
(74) *Attorney, Agent, or Firm* — Kristin L. Murphy

(57) ABSTRACT

A collapsible steering column assembly is disclosed, which comprises a collapsible steering column shroud that supports a collapsible steering shaft. The steering shaft has a first end for connection to a steering wheel of a vehicle a mounting bracket that supports the steering column shroud relative to the vehicle. The mounting bracket comprises a fixed portion secured to a fixed part of a vehicle body and a releasable portion secured to the steering shaft. The releasable portion is also secured to the fixed portion of the mounting bracket by one or more frangible connectors. The connectors are adapted to break in the event of a crash to permit the releasable portion and the steering shaft to move relative to the fixed portion. The fixed portion includes a first anvil which has a rounded nose that faces towards the steering wheel, and a guide part which is offset from the first anvil in a direction away from the steering wheel. The guide part has a surface that is vertically offset from an adjacent surface of the fixed portion of the mounting bracket to define a space bounded by the surface of the guide part. The adjacent surface of the fixed part of the mounting bracket defines a convoluted path. An energy absorption strap has a first region fixed to at least one of the steering column shroud and the releasable portion and from which the energy absorption strap extends along a path that first loops around the first anvil and then passes along the convoluted path.

10 Claims, 3 Drawing Sheets

(56) References Cited

U.S. PATENT DOCUMENTS

| | | |
|---|---|---|
| 2006/0033321 A1 | 2/2006 | Manwaring et al. |
| 2007/0013180 A1* | 1/2007 | Stuedemann .......... B62D 1/195 |
| | | 280/775 |
| 2010/0032933 A1* | 2/2010 | Cymbal ................ B62D 1/195 |
| | | 280/777 |
| 2014/0150594 A1 | 6/2014 | Riefe |

FOREIGN PATENT DOCUMENTS

| | | | | |
|---|---|---|---|---|
| CN | 109923023 A | * | 6/2019 | ............. B62D 1/184 |
| DE | 60313246 T2 | * | 12/2007 | ............. B62D 1/195 |
| EP | 1375297 B1 | * | 1/2007 | ............. B62D 1/195 |
| WO | WO-0076833 A1 | * | 12/2000 | ............. B62D 1/195 |
| WO | WO-2004101345 A2 | * | 11/2004 | ............. B62D 1/195 |

\* cited by examiner

STEERING COLUMN ASSEMBLY

CROSS-REFERENCE TO RELATED APPLICATION

This application claims priority to European Patent Application No. 21461608.8, filed Oct. 27, 2021 and GB Patent Application No. 2202121.6, filed Feb. 17, 2022, the disclosure of which is incorporated herein by reference in its entirety.

TECHNICAL FIELD

The disclosure relates to energy absorbing mechanisms for a steering column assembly, for controlling the rate of collapse of a steering column in the event of a crash. It also relates to a steering column assembly incorporating an energy absorption mechanism.

BACKGROUND

To improve the safety of the driver of a vehicle, it is known for a steering column assembly to be designed in such a way that it collapses if the driver is thrown forward on the steering wheel. This may happen at relatively low speeds if the driver is unrestrained. By enabling the steering wheel to move when struck by a driver, the force on the driver is reduced.

It is commonplace to provide an energy absorption mechanism that absorbs crash energy imparted to the steering wheel when the body of a driver is thrown forward onto the steering wheel. Controlling the movement of the steering wheel is better than simply allowing it move forward in an uncontrolled manner as it enables the loading applied by the driver to be carefully transferred to the vehicle body through the whole collapse stroke A typical energy absorption mechanism will absorb the crash energy by deforming at the steering column collapse. In most common arrangements, an elongate strap is dragged around a narrow opening causing it to be plastically deformed, or is dragged around a convoluted path as the steering column collapses which bends the strap and thereby absorbs energy. Friction may also be generated by the strap rubbing over the obstacles defining the convoluted path. The path may include a rigid anvil which the strap partially wraps around with energy being absorbed as the strap is dragged across the anvil. The anvil must be fixed in place relative to the body of vehicle and this is often achieved by making it a part of a mounting bracket of the steering column of the vehicle.

SUMMARY

What is needed is a steering column assembly that is collapsible and which can be easily modified without additional components for use in combination with different columns and/or different crash performance requirements.

According to a first aspect the disclosure, a collapsible steering column assembly is provided that includes an energy absorption mechanism, the steering column assembly comprising:
  a collapsible steering column shroud that supports a collapsible steering shaft that has a first end for connection to a steering wheel of a vehicle;
  a mounting bracket that supports the steering column shroud relative to the vehicle comprising a fixed portion secured to a fixed part of a vehicle body and a releasable portion secured to the steering shaft and also secured to the fixed portion of the mounting bracket by one or more frangible connectors, the connectors being adapted to break in the event of a crash to permit the releasable portion and the steering shaft to move relative to the fixed portion;
  whereby the fixed portion includes;
  a first anvil which has a rounded nose that faces towards the steering wheel,
  a guide part which is offset from the first anvil direction that is away from the steering wheel, and
  whereby guide part defines a hook that has a surface that is vertically offset from an adjacent surface of the fixed portion of the mounting bracket, the space between the surface of the guide part and the surface of the fixed part of the mounting bracket defining a convoluted path, and further comprising an energy absorption strap that has a first region fixed to at least one of the steering column shroud and the releasable portion of the mounting bracket and from which the energy absorption strap extends along a path that first loops around the first anvil and then passes along the convoluted path.

The steering assembly of the disclosure may be configured such that the way in which energy is absorbed during a collapse of the steering column assembly is determined at least in part by the relative position of the guide part and the adjacent parts of the upper surface of the mounting bracket determines the shape of the convoluted path.

The guide part may extend above a hole or recess in the fixed part of the mounting bracket arranged sot that the strap is forced to follow a convoluted path that extends down into and then back out of the recess or hole. In this case the region defining the convoluted path will be bounded by an underside surface of the guide part and by the edges or the hollow or recess, and in the case of a recess also by an upper surface of the recess.

The disclosure provides a simple arrangement where the crash force can adjusted by varying the relative position of the guide part relative to the hollow. Thus, the disclosure may result in one or more components currently used being omitted, simplifying the production process. An additional benefit of the disclosure relates to the ability to adjust the degree of energy absorption at the assembly stage of manufacture limiting or eliminating the effect of component variation on the final degree of energy absorption.

The relative position of the guide part to the first anvil at least in part determines the contact area between the energy absorption strap and the first anvil during the collapse of the steering shaft thereby affecting the force of friction between the energy absorption strap and the first anvil.

Additionally, the component of the collapse force perpendicular to the contact surface between the guide part and the energy absorption strap may be set at least in part by the relative height of the guide part to the upper surface of the fixed portion of the mounting bracket thereby affecting the force of friction between the guide part and the energy absorption strap.

In one exemplary arrangement, the guide part includes a projecting arm connected to the fixed portion of the mounting bracket on at least one side of a hollow or hole or recess of the mounting bracket. The position of this arm, for example its height relative to the upper surface of the fixed portion of the mounting bracket may be set during manufacture to determine the shape of the convoluted path. For example, setting the arm below the upper surface means the energy absorption strap must follow a highly convoluted path that passes first down into the hollow and then up out of the hollow. Setting the arm level with the surface makes this path less convoluted. Setting the arm above the surface by an amount less than the thickness of the energy absorption strap makes this path less convoluted again.

The position of the guide part may be adjustable, to permit adjustment of the crash force during the design, installation or a maintenance process.

In a simple, low cost, arrangement, the guide part and the fixed portion of the mounting bracket are formed as a single component of unitary construction. For example, the guide part may be formed by a u-shaped cut out in the fixed portion of the mounting bracket that defines a central tab which is then bent out of the plane defined by the upper surface of the fixed portion of the mounting bracket. Where the fixed portion of the mounting bracket is a stamped part, the hollow may be stamped into the upper surface thereof.

In an alternative arrangement, the guide part may be folded back above a region of the upper surface of the mounting bracket, that region being shaped to form a recess that bounds a lower side of the convoluted path.

In another exemplary arrangement, the guide portion may comprise a discrete component which is secured to the upper surface of the mounting bracket, for example by welding or bolts or use of adhesive. It may be removable to allow a range of differently shaped guide portions to be selected according to the desired performance of the assembly or may be resiliently deformable during manufacture to set the shape of the convoluted path.

The releasable portion of the mounting bracket may comprise a pair of depending arms which extend downwards along opposing sides of the steering shaft and a locking mechanism may be provided that secures the steering shaft to these arms. The locking mechanism may be adjustable to enable the reach and rake of the steering wheel to be adjusted.

The steering shaft may comprise an upper part and a lower part, with the two collapsing telescopically in the event of a crash.

Where the steering column shroud is telescoping and has a fixed portion and a moving portion, the first portion of the energy absorption strap may be secured to the fixed portion which is provided with a second anvil that faces away from the steering wheel. In this exemplary arrangement, the energy absorption strap wraps around the second anvil prior to wrapping around the first anvil at least during a collapse of the steering column assembly.

According to a second aspect the disclosure provides a method of configuring the steering column assembly according to the first aspect comprising determining a desired force-distance profile for a crash, determining one or more of the characteristics of the energy absorption strap and the dimensions of the steering column assembly, and setting the height of the guide part relative to the upper surface of the fixed portion of the mounting bracket as a function of the crash force-distance profile.

The method may be performed during manufacture or post assembly of the steering column assembly.

BRIEF DESCRIPTION OF DRAWINGS

There will now be described, by way of example only, an exemplary arrangement of the present disclosure with reference to and as illustrated in the accompanying drawings of which.

DETAILED DESCRIPTION

Figure 1:
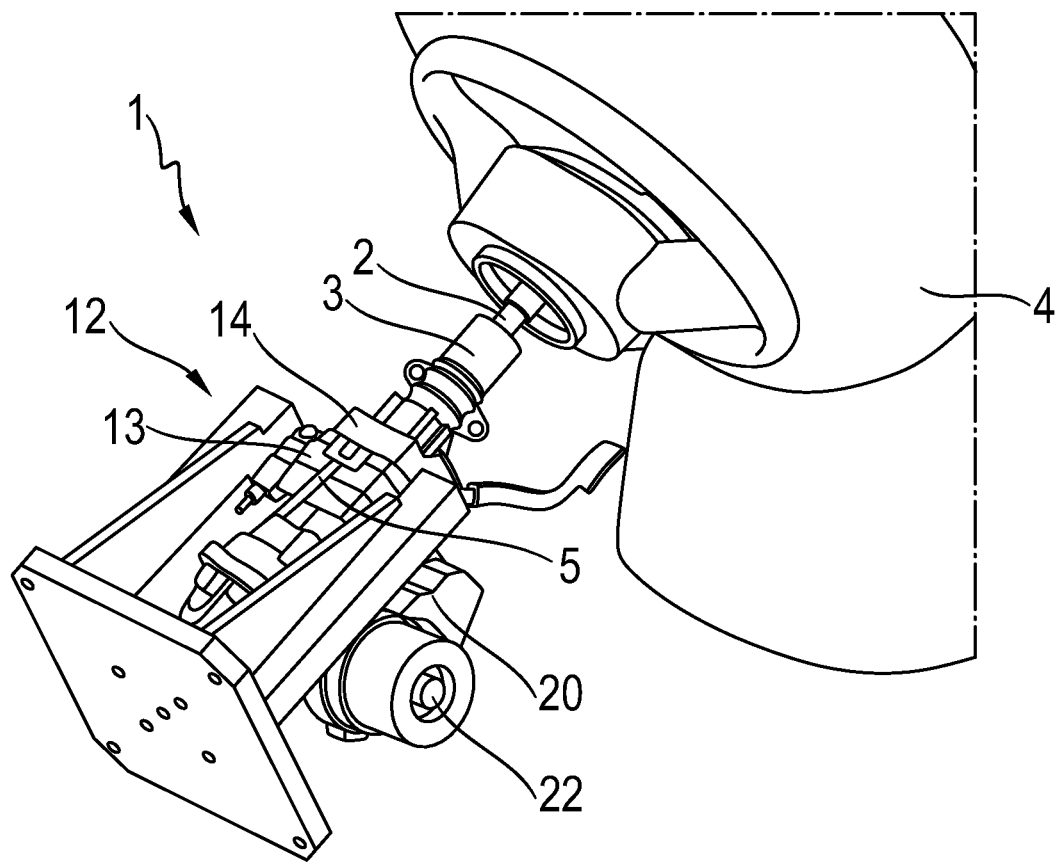
FIG. 1 is a perspective view of a first exemplary arrangement of a steering column assembly according to the present disclosure fitted to a steering wheel and a gearbox.
Figure 2:
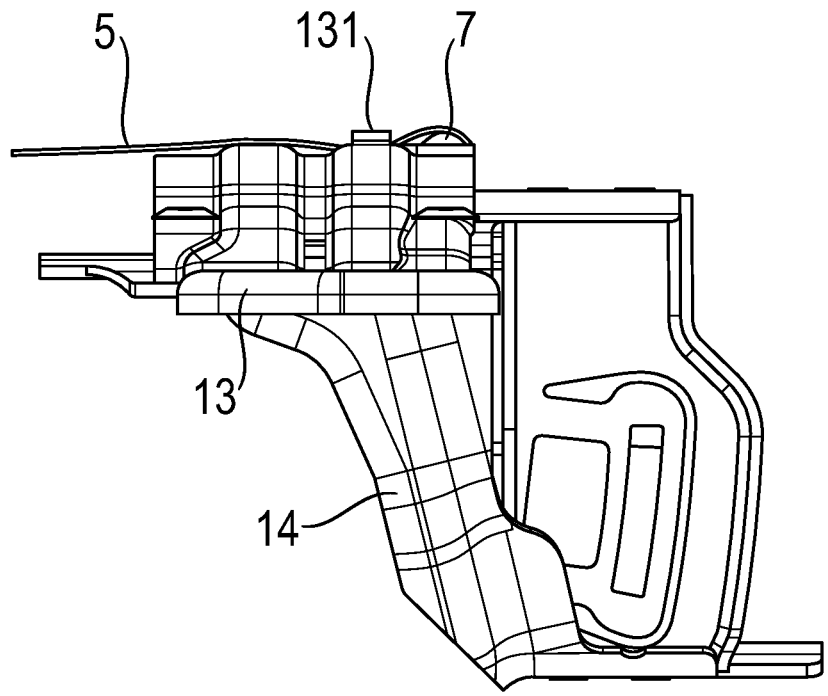
FIG. 2 is side view of the mounting bracket and energy absorption strap.
Figure 3:
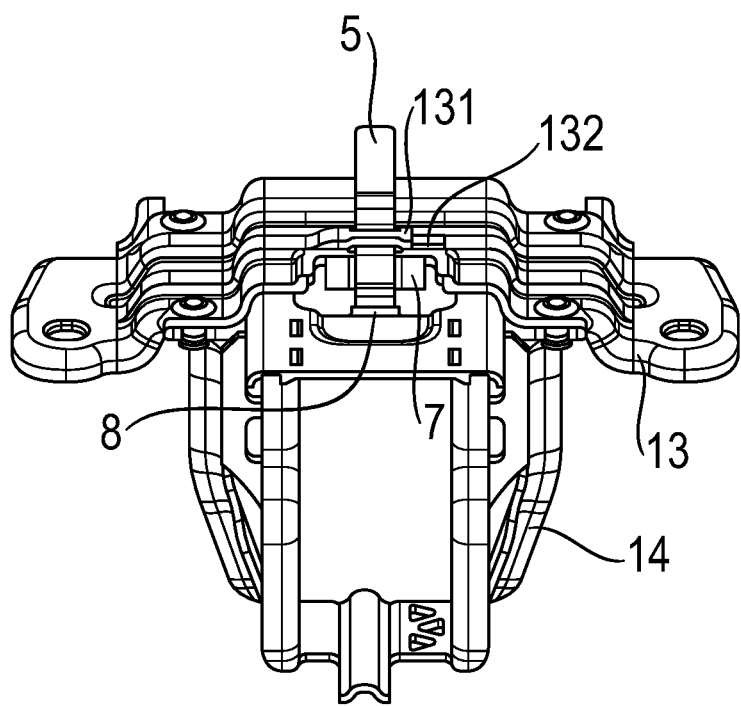
FIG. 3 is perspective view from the front and above of the mounting bracket and energy absorption strap.

FIG. 1 shows a collapsible steering column assembly (1) comprising a two part telescopically collapsible steering shaft (2) having an upper part and a lower part. The steering shaft is supported by bearings (not shown) within a telescopically collapsible steering column shroud (3). The steering shaft (2) has a first end for connection to a steering wheel (4) of a vehicle and a second end that engages a reduction gearbox (20). This gearbox (20) has an output that is connected to the roadwheels of the vehicle. As shown, a motor (22) is connected to the gearbox (20) to apply an electric assistance torque.

The steering column shroud (3) is fixed at an end furthest from the steering wheel (4) to the gearbox (20) which is in turn pivotally secured to a rigid part of the vehicle such as a cross member or bulkhead. The steering column shroud (3) is also fixed to a rigid part of the vehicle through a mounting bracket (12). A locking mechanism enables the position of the steering column shroud (3) relative to the mounting bracket to be adjusted by a driver to set the reach or the rake or in this example both the rake and reach of the steering. It is within the scope of the disclosure for the reach and or the rake to be unadjustable. In such an arrangement the locking mechanism will be set during manufacture.

The mounting bracket (12) has two portions, a fixed portion (13) and a releasable portion (14). The fixed portion (13) is a rigid metal bracket that is secured to a fixed part of a vehicle body by heavy duty bolts. The fixing should be strong enough to prevent any movement of the fixed portion (13) in the event of a crash. The releasable portion (14) is secured to the steering column shroud (3) by the locking mechanism and is also secured to the fixed portion (13) by one or more frangible connectors. These connectors prevent relative movement between the two portions of the mounting bracket (12) during normal use but will break in the event of a crash to permit the releasable portion (14) to move relative to the fixed portion (13). This movement allows the steering column shroud (3) and the steering shaft (2) to collapse when a high enough force is applied to the steering wheel during a crash.

The steering column assembly includes an energy absorption strap (5) which comprises a deformable elongate strap secured at a first end to the steering column shroud (3) and passing along a convoluted path that is defined by elements of the fixed portion (13) of the mounting bracket (12). The energy absorption strap (5) comprises a relatively rigid metal strap that passes around a first anvil (7) formed on an edge of the fixed portion (13) of the mounting bracket (12) closest to the steering wheel (4) which has a rounded nose that faces towards the steering wheel (4). Located behind the first anvil (7) is a guide part (131) which extends across a hollow (132) formed in an upper surface of the fixed portion (13) of the mounting bracket (12). The energy absorption strap (5) wraps around the first anvil (7) and then passes along a convoluted path defined by the guide part (131) and hollow (132). A second anvil (8) is also provided, located on the fixed portion of the steering column shroud (3) that the energy absorption strap (5) wraps around prior to wrapping around the first anvil (7).

Figure 4:
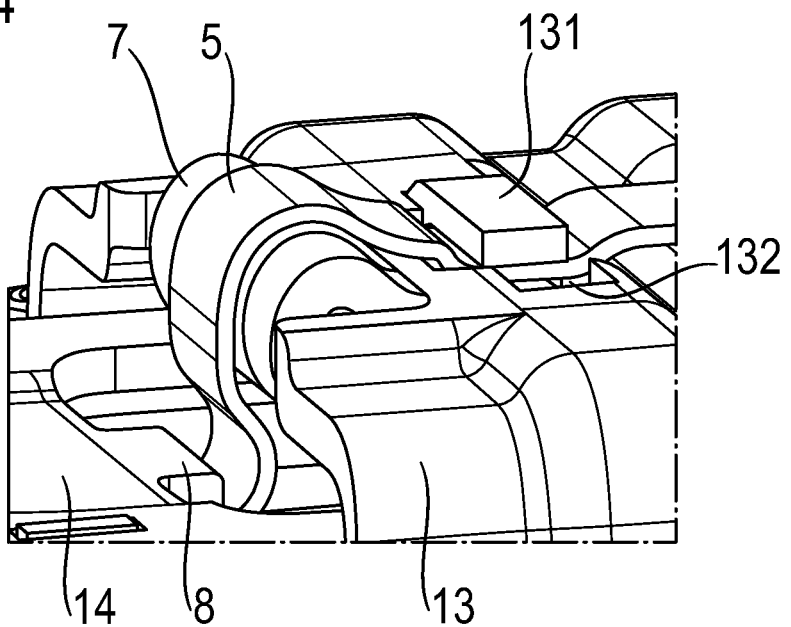
FIG. 4 is a view of the assembly with the guide part set to provide a high rate of energy absorption.
Figure 5:
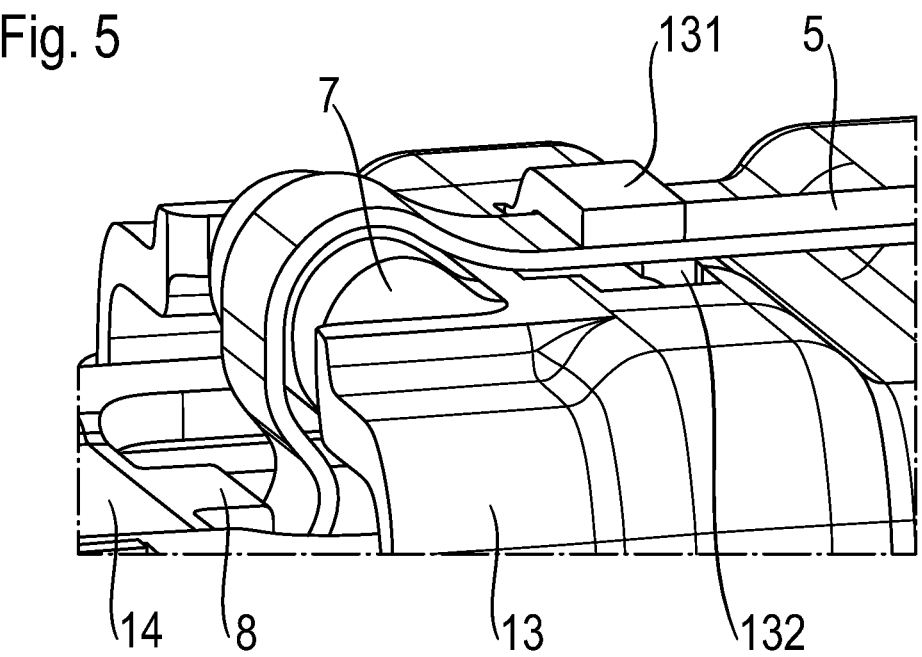
FIG. 5 is view corresponding to FIG. 4 with the guide part set to provide a low rate of energy absorption.

FIGS. 4 and 5 show the guide part (131) set at two different heights. This setting can be performed during manufacture or assembly of the steering column assembly (1). In FIG. 4, the guide part (131) is set vertically so that an underside is within the hollow (132) and below the upper surface of the fixed portion (13) of the mounting bracket (12). This requires the energy absorption strap (5) to follow a highly convoluted path. FIG. 5 shows the same steering column assembly (1) with the guide part (131) set higher so that the underside is actually above the hollow (132). This provides only the slightest of convoluted paths.

The height of the guide part (131) sets the amount of deformation of the energy absorption strap (5) as it is dragged across the first anvil (7) and around the convoluted path which in turn sets the amount of energy absorbed by the energy absorption strap (5). The more convoluted the path the more the energy absorption strap (5) is deformed during a crash and the more energy is absorbed.

In use, when a force is applied to the steering wheel (4) that causes the steering column assembly (1) to collapse, the steering column shroud (3) starts to move with the steering wheel (4). This causes the second anvil (8) to start to push on the energy absorption strap (5), pulling the energy absorption strap (5) around the first anvil (7) and through the convoluted path. As the energy absorption strap (5) is pulled along by the steering column shroud, energy is absorbed due to friction and due to the deformation of the energy absorption strap (5).

The invention claimed is:

1. A collapsible steering column assembly comprising:
a collapsible steering column shroud that supports a collapsible steering shaft that has a first end for connection to a steering wheel of a vehicle;
a mounting bracket that supports the steering column shroud relative to the vehicle, comprising a fixed portion secured to a fixed part of a vehicle body and a releasable portion secured to the steering shaft and also secured to the fixed portion of the mounting bracket by one or more frangible connectors, the connectors being adapted to break in the event of a crash to permit the releasable portion and the steering shaft to move relative to the fixed portion;
wherein the fixed portion includes;
a first anvil which has a rounded nose that faces towards the steering wheel,
a guide part which is offset from the first anvil in a direction away from the steering wheel, and
wherein the guide part has a surface that is vertically offset from an adjacent surface of the fixed portion of the mounting bracket to define a space bounded by the surface of the guide part and the adjacent surface of the fixed part of the mounting bracket defining a convoluted path, and further comprising an energy absorption strap that has a first region fixed to at least one of the steering column shroud and the releasable portion of the mounting bracket and from which the energy absorption strap extends along a path that first loops around the first anvil and then passes along the convoluted path.

2. A steering column assembly according to claim 1, further comprising a hollow or recess formed in an upper surface of the fixed portion of the mounting bracket.

3. A steering column assembly according to claim 2, wherein the hollow or recess is one of a cut out or a depression.

4. A steering column assembly according to claim 3, wherein the relative height of the guide part to the upper surface of the fixed portion of the mounting bracket is adjustable and may be set during or post manufacture such that the height at least partially determines a force of friction between either the guide part and the energy absorption strap or the first anvil and the energy absorption strap or both.

5. A steering column assembly according to claim 4, wherein the steering column shroud comprises a second anvil that faces away from the steering wheel, and wherein the energy absorption strap wraps around the second anvil prior to wrapping around the first anvil at least during a collapse of the steering column assembly.

6. A steering column assembly according to claim 2, wherein the guide part comprises a projecting arm that extends at least partially across the hollow or above the recess and which is connected to the fixed portion of the mounting bracket on one or two sides of the hollow, the surface of the guide part comprising an underside of the guide part.

7. A steering column assembly according to claim 1, wherein the relative height of the guide part to the upper surface of the fixed portion of the mounting bracket is adjustable and may be set during or post manufacture such that the height at least partially determines a force of friction between either the guide part and the energy absorption strap or the first anvil and the energy absorption strap or both.

8. A steering column assembly according to claim 1, wherein the steering column shroud comprises a second anvil that faces away from the steering wheel, and wherein the energy absorption strap wraps around the second anvil prior to wrapping around the first anvil at least during a collapse of the steering column assembly.

9. A method of manufacture of a fixed portion of a mounting bracket according to claim 1 comprising the steps of forming the guide part by cutting or stamping a u-shape in the fixed portion of the mounting bracket and bending the guide part out of the plane of the upper surface of the fixed portion of the mounting bracket to form the hollow.

10. A method of manufacture according to claim 9 further comprising the steps of; determining a desired force-distance profile for a crash, determining at least one of the characteristics of the energy absorption strap and the dimensions of the steering column assembly, and setting a height of the guide part relative to the upper surface of the fixed portion of the mounting bracket as a function of the crash force-distance profile.

* * * * *